Patented Dec. 11, 1945

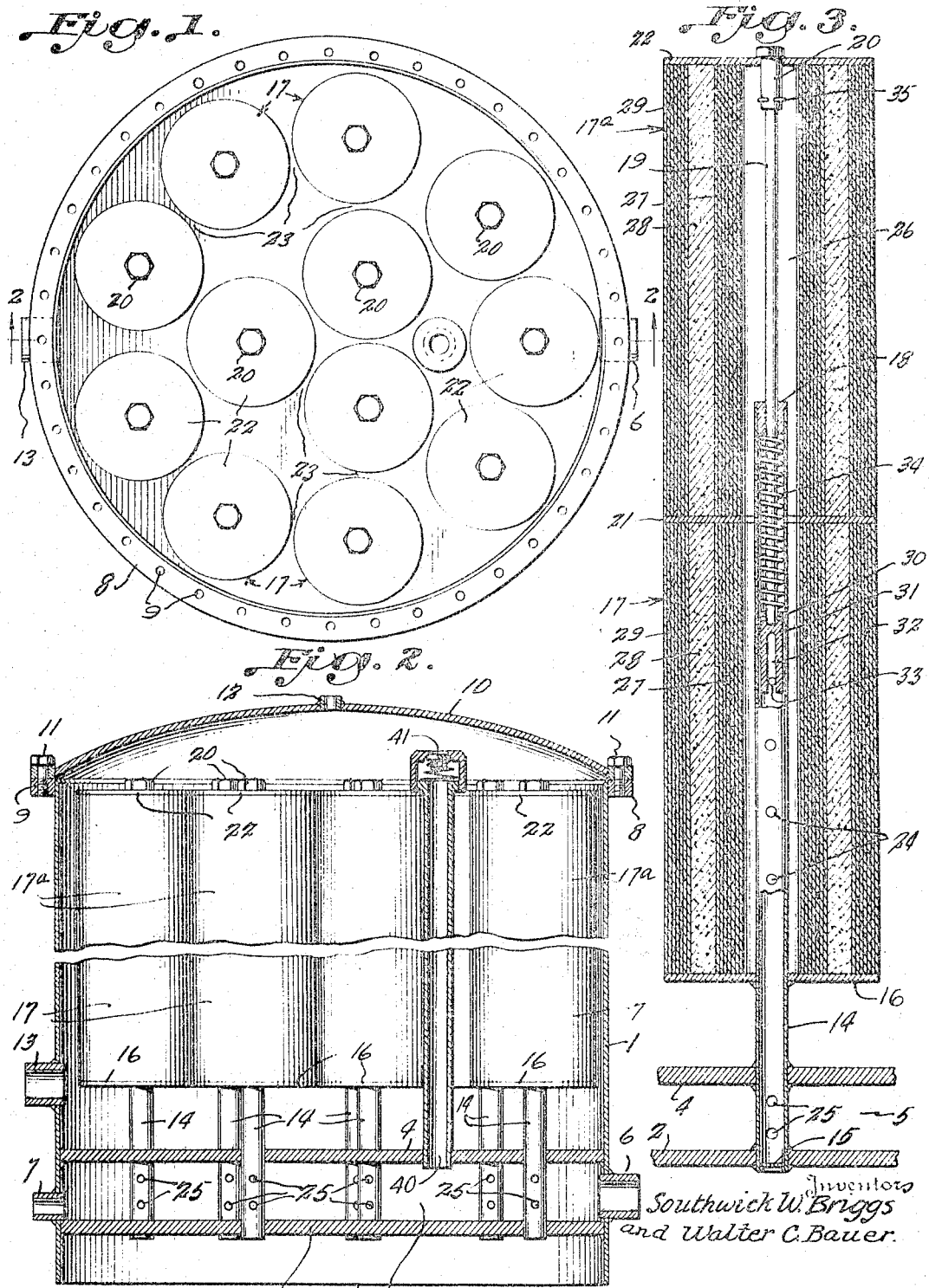

2,390,494

UNITED STATES PATENT OFFICE 2,390,494

CLARIFYING APPARATUS

Southwick W. Briggs, Washington, D. C., and Walter C. Bauer, Chevy Chase, Md.; said Bauer assignor to Briggs Clarifier Company, Washington, D. C., a corporation of Delaware Application October 27, 1943, Serial No. 507,824

9 Claims. (Cl. 210—184)

The present application is a continuation-in-part of our copending application, Serial No. 448,464, filed June 25, 1942.

This invention relates to clarifying or filtering apparatus and more particularly has reference to details of construction of the means for supporting tubular filter elements within a filtering or clarifying apparatus.

Filtering or clarifying apparatus, especially for the purification of the lubricating oils of internal combustion and other types of engines in which the oil is circulated through the engine are being used extensively. Such filtering or clarifying apparatus, particularly when used for purifying the oil of engines for marine propulsion, must be constructed to fit into rather small spaces due to the lack of available space on shipboard. Quite often it is necessary to sacrifice the efficiency of the purifying apparatus due to the fact that a smaller apparatus than desired must be used because of the limited space available. In most of the filtering or purifying apparatus developed heretofore, considerable space was required due primarily to the manner in which the filtering elements were mounted within the main chamber of the apparatus. In a number of installations, particularly in those employing tubular filtering elements, the said elements are spaced apart a considerable distance not because of any increased efficiency due to said spacing, but primarily because of the construction used in the apparatus for supporting and housing said filter elements. Even in the most compact type of apparatus heretofore developed, it has been found that the tubular filter elements are spaced apart a considerable distance.

The principal object of the present invention is to avoid the disadvantages of the prior art as pointed out above.

Another object of this invention is to provide a clarifying or purifying apparatus comprising a plurality of tubular filter elements in which said tubular filter elements are closely spaced so that they may be fitted into spaces which with ordinary prior art constructions would be capable of housing filtering apparatus having only a fraction of the capacity and efficiency desired.

A further object of this invention is to provide a filtering or clarifying apparatus which comprises a cylindrical chamber having a plurality of tubular filter elements positioned therein with their axes parallel to the axis of said chamber and with their peripheral portions in close proximity to each other.

Still another object of this invention is to provide a clarifying or purifying apparatus which comprises a cylindrical chamber having a plurality of tubes extending into said chamber from one end wall thereof, said tubes having their axes parallel to and spaced about the axis of the chamber, a plurality of tubular filter elements mounted on said tubes; the axes of said tubes being spaced apart a distance slightly greater than the diameter of said tubular filter elements whereby the peripheral portions of said tubular filter elements will lie in close proximity to each other.

A still further object of this invention is to provide an apparatus for clarifying or purifying fluids which comprises a cylindrical chamber having a bottom wall and a false bottom wall, a plurality of tubes extending through said bottom and false bottom walls into said chamber with their axes parallel to and spaced about the axis of said cylindrical chamber, flanges carried by said tubes adjacent the false bottom wall, tubular filter elements mounted on said tubes with their lower ends supported by said flanges, the axes of said tubes being spaced apart a distance slightly greater than the diameter of said tubular filter elements whereby the peripheral portions of the latter lie in close proximity to the other, means carried by the upper ends of said tubes for clamping said filter elements onto the flanges supporting the same, means for introducing a fluid into said chamber about the outer portions of said tubular filter elements, said tubes being apertured above said flanges and intermediate the bottom and false bottom walls, and means for discharging fluid which has passed inwardly through the tubular filter elements into and down through said tubes into the space between the bottom and false bottom.

Yet another object of this invention is to provide a resilient mounting for removable filter units.

With these and other objects in view, which will appear from the description of the invention and the illustrations of the same in the drawing, the invention resides in the parts and combinations hereinafter set forth and in the particular manner of assembling the tubular filter elements in a chamber whereby all of the available space will be utilized.

In order to more fully understand the present invention, reference is made to the accompanying drawing in which:

Figure 1 is a plan view of a clarifying or purifying apparatus constructed in accordance with the present invention having its top portion removed.

Figure 2 is a vertical sectional view taken on line 2—2 of Figure 1.

Figure 3 is an axial sectional view of one of the tubular filter elements utilized in the present invention.

As illustrated in the drawing, the purifying or clarifying apparatus according to the present invention comprises a cylindrical chamber or drum 1 which has a bottom wall 2 welded into the lower end thereof at a point slightly above the extreme lower end 3 of said chamber. Slightly spaced above the bottom wall 2 of said chamber is a false bottom wall 4. The bottom wall 2 and the false bottom wall 4 provide a space 5 between the same which is provided with a discharge outlet 6 and sludge outlet 7 adjacent the bottom wall 2. At the extreme upper end, the chamber 1 is provided with a peripheral flange 8 which has a plurality of circumferentially spaced openings 9 formed therein. A dome-shaped top or closure 10 is adapted to be secured onto the upper open end of said chamber 1 by means of screws 11 which are received within the threaded openings 9 of the chamber 1. At the central upper opening there is provided a threaded boss 12 by means of which a pressure gauge may be mounted on top of said chamber.

The portion of said chamber above the false bottom 4 is provided with an inlet 13 for fluid to be filtered.

Projecting through the bottom and false bottom walls 2 and 4 are a plurality of tubes 14 which are provided with closures 15 in their lower ends and which extend upwardly into the interior of chamber 1 in a direction parallel to the axis of said chamber. Secured on each of said tubes 14 at a point spaced above the false bottom wall 4 is a flange 16 which serves as a support for a tubular filter element 17 which is mounted on the tube 14.

In the particular construction illustrated in the drawing, the tubes 14 extend slightly more than halfway up into the interior of the chamber 1 and are provided at their upper free ends with an apertured plug 18 fixed thereto and through which slidably extends a rod 19 threaded at its upper end to receive a bushing nut 20. Fixed to the lower end of the rod by means of a pin 30 is a plunger 31 provided with a slot 32. Extending transversely through the tube 14 and the slot 32 is a pin 33 which serves as a guide for preventing rotation of plunger 31 and the rod 19 fixed thereto and which serves also as a stop to limit downward movement of plunger 31. A coil spring 34 positioned between plug 18 and plunger 31 serves to urge the plunger 31 and the rod 19 downwardly. As before indicated, downward movement of the plunger 31 under the action of the spring 34 is limited by the pin 33.

The action of pin 33 which prevents rotation of the plunger 31 and the rod 19 enables the bushing nut 20 to be threaded onto and removed from the rod 19.

A single filter element 17 or a double filter element 17 and 17a having an annular disc 21 interposed therebetween is mounted on each tube with the lower end thereof supported on the flange 16. A plate 22 is positioned on the extreme upper end of the single or double filter element and said filter element is clamped between said flange 16 and the plate 22 by tightening of said nut 20 on the upper threaded end of the rod 19. To maintain the nut 20 in association with the plate 22, a spring snap ring 35 may be applied to the tubular portion of the nut 20 in an annular recess or notch provided therefor as illustrated in Figure 3 of the drawing. It will be appreciated that the vertically extending tubes 14 with the flanges 16 carried adjacent the lower portions thereof and the means for clamping the filter elements against said flanges 16 serve as effective means of mounting the tubular filter elements within the chamber 1. In this connection, it will be noted that none of the supporting structure for the tubular filter elements extends beyond the outer periphery of the filter elements. This structure enables the tubular filter elements to be placed in close proximity to each other as illustrated in Figure 1 of the drawing.

The manner of mounting the rods 19 in the upstanding tubes 14 so that a resilient force is exerted on the rods urging them downwardly into the tubes 14 enables the filter elements to be assembled in position with a substantially uniform force exerted thereon by the action of the spring 34. This construction prevents exerting too great a pressure on the filter elements as may be the case in a construction in which the filter elements are clamped in position by the tightening of nuts on the rods carrying the filter elements.

In order to effectively position the tubular filter elements within the chamber 1 as close as possible so that as much as possible of the available space within the chamber 1 will be occupied by the filter elements, the tubes are spaced apart in the manner illustrated. In other words, the axes of the tubes 14 are spaced apart a distance slightly greater than the diameter of the tubular filter element so that said filter elements will have their outer peripheral portions lying substantially in contact with each other or slightly spaced apart as indicated by reference character 26. Of course, it will not always happen that the entire space within the cylindrical chamber will be completely occupied and likewise it will not always happen that the peripheral portions of the tubular filter elements will lie in contact with each other but as many of the tubular filter elements as can possibly be crowded into the space available can, with the present invention, be assembled within the chamber.

It will be noted that the tubes 14 are provided with a plurality of openings 24 above the flange 16 which permits the fluid which has passed through the filter element to flow into the tubes 14. Intermediate the bottom and false bottom walls 2 and 4 the tubes 14 are provided with a plurality of apertures 25 which affords communication between the interior of the tubes and the space 5 between said walls 2 and 4.

The tubular filter elements 17 and 17a may comprise an inner tubular portion 27 of cellulosic filtering material, an intermediate portion 28 of bauxite or other similar filtering material and an outer portion 29 of cellulosic material. If desired, an inner tube of perforated metal (not shown) may be employed to reinforce the filter element. Also, if desired, the filter element may be encased in an open mesh fabric to retain the shape of the same.

Preferably the filter is provided with a suitable relief valve for the ready escape of air from the chamber 1 and also to permit by-passing the filter elements in the event they are unable to handle the volume of oil charged to the chamber. The relief mechanism may comprise a pipe 40 mounted in the false bottom 4, and extending upwardly above the top of the filter elements. A suitable relief valve 41 may be mounted in the top of the pipe 40 to permit the entrance of air from the dome into the pipe when the pressure reaches a predetermined amount, and also to bypass oil when necessary.

All of the elements of the apparatus illustrated in the drawing may be effectively joined together by welding or in any other suitable manner.

In operation, the tubular filter elements 17 and 17a are assembled about the tubes or rod extensions 19 as illustrated in Figure 3 of the drawing. The top 10 is then secured in closed position on chamber 1 and the fluid to be filtered is introduced into the chamber through inlet 13 to flow about the peripheral portions of the tubular filter elements. the fluid being filtered will pass substantially radially through the tubular filter elements into the space 26 in the center thereof and from this space will flow through the apertures 24 into the interior of the tubes 16. At the lower portions of the tubes 16, the filtered fluid will pass through the apertures 25 to the space 5 from which it will be discharged through outlet 6.

From the foregoing description, it will be appreciated that the apparatus of the present invention affords a compact construction which will enable the maximum amount of filter surface to be introduced into a minimum space. This apparatus will satisfactorily and completely fill many requirements and will enable filter elements of desired capacity or efficiency to be installed in spaces in which heretofore filters of insufficient capacity or inadequate efficiency only could be used.

We claim:

1. A filtering apparatus comprising a chamber, an apertured tube projecting into the chamber from one wall thereof, a flange carried by said tube and spaced from said chamber wall, a rod carried by the tube for axial movement relatively thereto and having a free end projecting from the end of the tube, means resiliently urging said rod into said tube, tubular filter means surrounding said tube and rod, and means cooperating with the free end of the rod for clamping the tubular filter means between the said cooperating means and said flange.

2. A filtering apparatus comprising a chamber, a plurality of apertured tubes projecting into the chamber from one wall thereof, a flange carried by each of said tubes and spaced from said chamber wall, a rod carried by each tube for axial movement relatively thereto and having a free end projecting from the end of the tube, means resiliently urging the rods into the tubes, and means cooperating with the free end of each rod for clamping the tubular filter means between the said cooperating means and said flange, said tubes being spaced apart a distance slightly greater than the diameter of said tubular filter means whereby the maximum number of said elements will be snugly grouped in said chamber.

3. A filtering apparatus comprising a cylindrical chamber having a bottom wall and a false bottom wall, a plurality of tubes extending through said bottom and false bottom walls with their axes parallel to the axis of said cylindrical chamber and with their ends adjacent the bottom wall closed, the portions of said tubes between the bottom and false bottom walls being apertured to provide communication between the interior of said tubes and the space between the bottom and the false bottom walls of said chamber, a flange mounted on each of said tubes at a point slightly spaced above the false bottom wall, means closing the upper ends of the tubes, tubular filter elements mounted on and surrounding said tubes, means resiliently cooperating with said closure means on the upper ends of said tubes for clamping said filter elements between said resilient means and said flanges on the tubes, means for introducing a fluid to be filtered into said chamber, the portions of said tubes above said flanges being apertured to receive fluid passed through said filter elements to conduct the same down through said tubes into the space between the bottom and false bottom, and means for discharging filtered fluid from said space between the bottom and the false bottom.

4. A filtering apparatus comprising a cylindrical chamber having a bottom wall and a false bottom wall, a plurality of tubes extending through said bottom and false bottom walls with their axes parallel to the axis of said cylindrical chamber and with their ends adjacent the bottom wall closed, the portions of said tubes between the bottom and false bottom walls being apertured to provide communication between the interior of said tubes and the space between the bottom and the false bottom walls of said chamber, a flange mounted on each of said tubes at a point slightly spaced above the false bottom wall, means closing the upper ends of said tubes, tubular filter elements mounted on and surrounding said tubes, means resiliently cooperating with said closure means on the upper ends of said tubes for clamping said filter elements between said resilient means and said flanges on the tubes, means for introducing a fluid to be filtered into said chamber, the portions of said tubes above said flanges being apertured to receive fluid passed through said filter elements to conduct the same down through said tubes into the space between the bottom and false bottom, and means for discharging filtered fluid from said space between the bottom and the false bottom, the axes of said tubes being spaced apart a distance slightly greater than the diameter of said tubular filter elements whereby the maximum number of said elements may be snugly grouped within said chamber.

5. A filtering apparatus comprising a cylindrical chamber having a bottom wall and a false bottom wall, a plurality of tubes extending through said bottom and false bottom walls with their axes parallel to the axis of said cylindrical chamber and with their ends adjacent the bottom wall closed, the portions of said tubes between the bottom and false bottom walls being apertured to provide communication between the interior of said tubes and the space between the bottom and the false bottom walls of said chamber, a flange mounted on each of said tubes at a point slightly spaced above the false bottom wall, means closing the upper ends of said tubes, tubular filter elements mounted on and surrounding said tubes, resiliently mounted means cooperating with said closure means on the upper ends of said tubes for clamping said filter elements between said resilient means and said flanges on the tubes, means for introducing a fluid to be filtered into said chamber, the portions of said tubes above said flanges being apertured to receive fluid passed through said filter elements to conduct the same down through said tubes into the space between the bottom and false bottom, and means for discharging filtered fluid from said space between the bottom and the false bottom, said means carried by the closures on the ends of the tubes being in the form of rods serving as extensions in alignment with said tubes whereby tubular filter elements of lengths greater than that of the tubes may be mounted on said tubes.

6. A filtering apparatus comprising a chamber, an apertured tube projecting into the chamber from one wall thereof, a flange carried by said tube and spaced from said chamber wall, a plug fixed in the end of said tube and having an axial bore, a rod slidably mounted in said bore and having a free end projecting from the tube, a resilient means urging said rod into the tube, tubular filter means surrounding said tube and rod, and means cooperating with the free end of the rod for clamping the tubular filter means between said cooperating means and said flange.

7. A filtering apparatus comprising a chamber, an apertured tube projecting into the chamber from one wall thereof, a flange carried by said tube and spaced from said chamber wall, a plug fixed in the end of said tube and having an axial bore, a rod slidably mounted in said bore and having a free end projecting from the tube, a plunger positioned in said tube and secured to the rod in said tube, a spring interposed between the plug and plunger, urging said rod into said tube, tubular filter means surrounding said tube and rod, and means cooperating with the free end of the rod for clamping the tubular filter means between said cooperating means and said flange.

8. A filtering apparatus comprising a chamber, an apertured tube projecting into the chamber from one wall thereof, a flange carried by said tube and spaced from said chamber wall, a plug fixed in the end of said tube and having an axial bore, a rod slidably mounted in said bore and having a free end projecting from the tube, a plunger positioned in said tube and secured to the rod in said tube, a spring interposed between the plug and plunger, urging said rod into said tube, means for preventing rotation of the plunger in said tube, tubular filter means surrounding said tube and rod, and means threadedly cooperating with the free end of the rod for clamping the tubular filter means between said threaded means and said flange.

9. A filtering apparatus comprising a chamber, an apertured tube projecting into the chamber from one wall thereof, a flange carried by said tube and spaced from said chamber wall, a plug fixed in the end of said tube and having an axial bore, a rod slidably mounted in said bore and having a free end projecting from the tube, a plunger positioned in said tube and secured to the rod in said tube, a spring interposed between the plug and plunger, urging said rod into said tube, said plunger having a slot extending axially of the said tube, a pin fixed to said tube and positioned in said slot for preventing rotation of the plunger in said tube, tubular filter means surrounding said tube and rod, and a plate threaded upon the free end of the rod for clamping the tubular filter means between said plate and said flange.

SOUTHWICK W. BRIGGS.
WALTER C. BAUER.